United States Patent [19]

Kamanaka

[11] 4,454,862
[45] Jun. 19, 1984

[54] WARMER APPARATUS FOR HORTICULTURE FACILITIES UTILIZING SOLAR HEAT

[76] Inventor: Ryusuke Kamanaka, c/o Nepon Co. Ltd., No. 4-2, Shibuya 1-chome, Shibuya-ku, Tokyo-to, Japan

[21] Appl. No.: 304,074

[22] Filed: Sep. 21, 1981

[30] Foreign Application Priority Data

Oct. 1, 1980 [JP] Japan .................. 55-135809

[51] Int. Cl.³ .................................. F24J 3/02
[52] U.S. Cl. ........................ 126/421; 126/435; 126/437; 47/17
[58] Field of Search ............ 126/428–432, 126/450, 435, 436, 437, 400, 421, 419; 47/17; 98/33 A, 33 R, 32; 165/122

[56] References Cited

U.S. PATENT DOCUMENTS

| | | | |
|---|---|---|---|
| 4,289,116 | 9/1981 | Williams | 126/431 |
| 4,291,674 | 9/1981 | Comte et al. | 126/437 |
| 4,313,420 | 2/1982 | Poeschl | 126/431 |

*Primary Examiner*—J. C. Yeung

[57] ABSTRACT

A heat exchange apparatus which utilizes the solar heat, hot spring water or underground water comprises a cylindrical main body, an internal cylinder placed in the main body, a blower provided in an upper part of the internal cylinder, an air intake, a number of radially arranged air exhaust tubes, ring shaped upper and lower heat exchange compartments, and chambers formed between heat exchange compartments, on and under the upper and lower heat exchange compartment, upper and lower chambers are connected by coil tubes placed in heat exchange compartments, the outer coil tubes and inner coil tubes are successively connected so that each of connected coil tubes has the same overall length, which improves efficiency of heat exchange between air and water which are caused to move in a counter-flow fashion.

Such a heat exchange apparatus or its modification is utilized in a warmer apparatus for horticulture facilities utilizing solar heat comprising a sensor device provided in a greenhouse to detect the greenhouse temperature, a heat exchange device of a water-air counter-flow type functioning to collect and discharge heat provided with a control unit regulating various devices, a circulating pump and linked heat storage tanks serving as heat stocking means with a change-over valve to change the flow of water and sensors to detect water temperature are provided to pipings connecting said heat exchange device and heat storage tanks.

1 Claim, 11 Drawing Figures

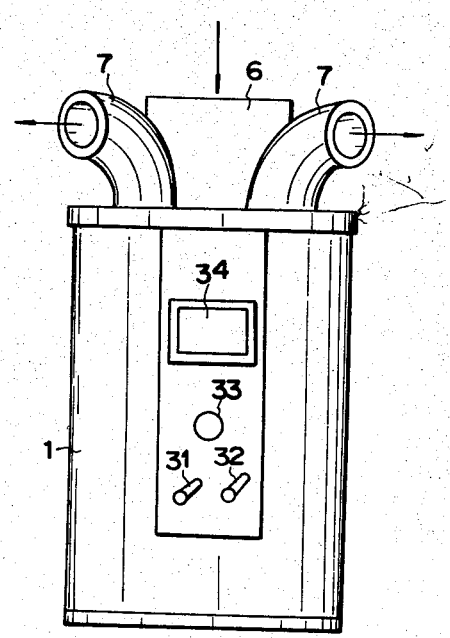
FIG. 1
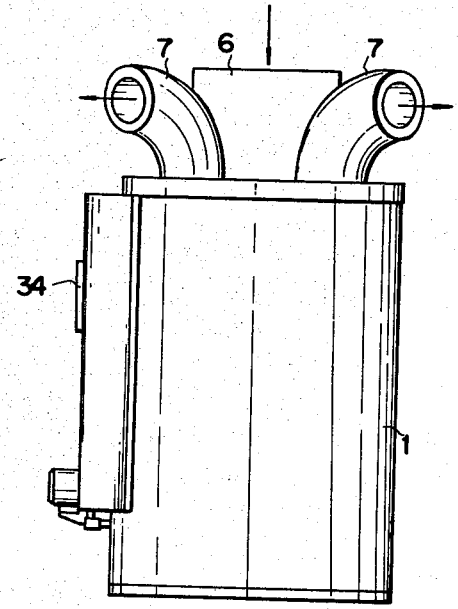
FIG. 2
FIG. 3
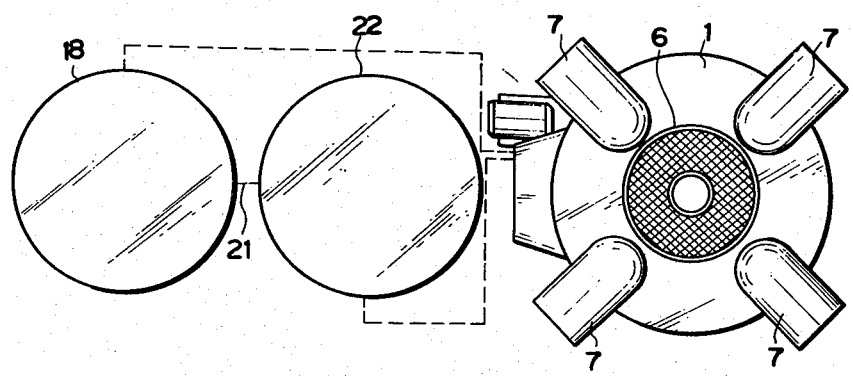

WARMER APPARATUS FOR HORTICULTURE FACILITIES UTILIZING SOLAR HEAT

CROSS REFERENCES TO RELATED APPLICATIONS

This application relates to application Ser. No. 304,073 filed Sept. 21, 1981 by Masatoshi Kuwa, Ryusuke Kamanaka, and Toshio Nihei and to application Ser. No. 330,380 filed Dec. 14, 1981 by Masatoshi Kuwa, Kimio Kondo, Ryusuke Kamanaka, and Toshio Nihei, both assigned to the assignee of the present invention.

BACKGROUND OF THE INVENTION

This invention is directed to a heat exchange apparatus and a warmer apparatus utilizing said heat exchange apparatus which is used in horticulture facilities, and more particularly to a heat exchange apparatus utilizing the solar heat and a warmer apparatus for use in horticulture facilities in which is incorporated said heat exchange apparatus.

The present invention concerns a heat exchange apparatus which for example causes heat generated in a greenhouse during the day to be absorbed by circulating water in order to stock such heat in water tanks and then let such stored heat discharged or emitted to effect warming of the greenhouse during the night without utilizing any artificially created heat source, or a heat exchange apparatus for heating or air cooling purpose which utilizes hot spring water or subterranean water.

This invention also relates to a warmer apparatus in which there are provided said heat exchange apparatus of specially designed water-air counterflow type operated highly effectively at a slight difference of temperatures of water and air and heat storage means comprising water tank units linked with each other, said heat exchange apparatus and heat storage means are connected by piping means, wherein water is employed as a medium and also as a regenerative source.

The background of one embodiment of the invention will be briefly described first. Needless to say, horticulture facilities of any country are indispensable to its national life. Ever since the so-called oil-shock, saving of fuels of the petroleum family consumed in heating has become one of the most important and urgent problems. In order to cope with the problem, the saving of petroleum is being tried in one direction which comprises an efficiency improvement and lowering of the load, for example development of high performance warmer apparatus, improved use of warmer apparatus, lessening of the load in the warmer apparatus through thermal insulation and so forth.

One of the most expected means for attaining the abovedescribed object that will be accepted generally is the utilization of the solar heat. In addition exploitation of the wind power, terrestrial heat, scrap wood, coal or natural gas to replace petroleum is being studied. Of these, it is needless to say that the use of the solar heat is the most universal.

In those areas of Japan where horticultural facilities are in use, for example, there is so much irradiation of the solar heat into the greenhouse during the day throughout the season when the warming and thermal insulation are required, the solar heat being sufficient to secure the energy required for the night time warming, which suggests the possibility of positively utilizing the solar heat.

A given temperature may be grasped as a heat conversion source, a greenhouse or the like itself being employed as a heat collecting means. One method to carry out this reasoning is a terrestrial heat exchange type house. However, the house of this type requires for heat exchange purposes wind tunnels of which floor area is substantially equal to that of the house, making the space of the wind tunnel enormously large, increasing time and labor needed to dig the ground, having a weakness that the storage of heat under the ground cannot be satisfactorily realized when the size of the house to be warmed and the effect of warming are taken into consideration, not to mention the defects such as water leakage and/or permeation of water. Wet air of sufficiently high temperature is not easily available according to such subterranean heat exchange. Heat emitted in the initial stage of the night time warming which lasts from two to three hours is relatively substantial. However, as the subterranean temperature goes down, and particularly at the final phase of the warming operation, warming capacity becomes so weakened that the emitted heat is very little. Furthermore, there is a need to supply large quantity of air to the long pipings of big diameter under the ground, so that the power required by the blower must be large.

SUMMARY OF THE INVENTION

It is therefore a general object of this invention to offer a heat exchange apparatus which is capable of efficiently stocking heat such as the solar heat and exchanging the stored heat with water.

It is another object of the invention to offer a warmer apparatus of horticulture facilities in which the abovedescribed heat exchange apparatus is incorporated.

The purpose of the present invention is to offer an apparatus of high reliability that is stable in operation by virtue of a unique system of heat collecting and heat discharge as well as an overall control thereof.

In one embodiment of the invention to achieve said object, there is provided internally of a longitudinal cylindrical main body formed with a bottom an internal cylinder having a diameter smaller than that of the main body in such a manner that there is provided a desired space between the lower part of the internal cylinder and the bottom of the main body, a wind guide of conical shape is provided to the central part of the lower bottom of the main body, a blower is provided in an upper part of the internal cylinder, an air intake is provided above said internal tube, a plurality of air exhaust tubes are radially provided at the upper end portion of the space between the main body and the internal cylinder, ring shaped upper and lower heat exchange compartments are separately formed in such a manner that chambers are formed between the upper and lower heat exchange compartments, on the upper heat exchange compartment and under the lower heat exchange compartment, with upper and lower chambers being connected to communicate with each other, multiple winding concentric coil tubes are accommodated in the upper and lower heat exchange compartments, ends of upper and lower coil tubes are arranged so that other coil tubes and inner coil tubes may be successively connected, ends of upper coil tubes are connected to a header in the upper chamber and ends of lower coil tubes to a header in the lower chamber, water supply tube is connected to a water inlet of the upper header and a water discharge tube to a water outlet of the lower header.

In another embodiment of the invention to achieve aforedescribed object, a warmer apparatus for horticulture facilities utilizing solar heat comprises a sensor device provided in a greenhouse to detect the greenhouse temperature, a heat exchange device of a water-air counterflow type functioning to collect and discharge heat provided with a control unit regulating various devices, a circulating pump and linked heat storage tanks serving as heat stocking means with a change-over valve to change the flow of water and sensors to detect water temperature are provided to pipings connecting said heat exchange device and heat storage tanks.

The above and further objects and novel features of the invention will appear more fully from the following detailed description when read in connection with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike:

FIG. 1 is a front view of an apparatus according to the present invention,

FIG. 2 is a side view of the apparatus of FIG. 1,

FIG. 3 is a plan view of the apparatus of FIG. 1,

DESCRIPTION OF THE PREFERRED EMBODIMENT

Figure 4:
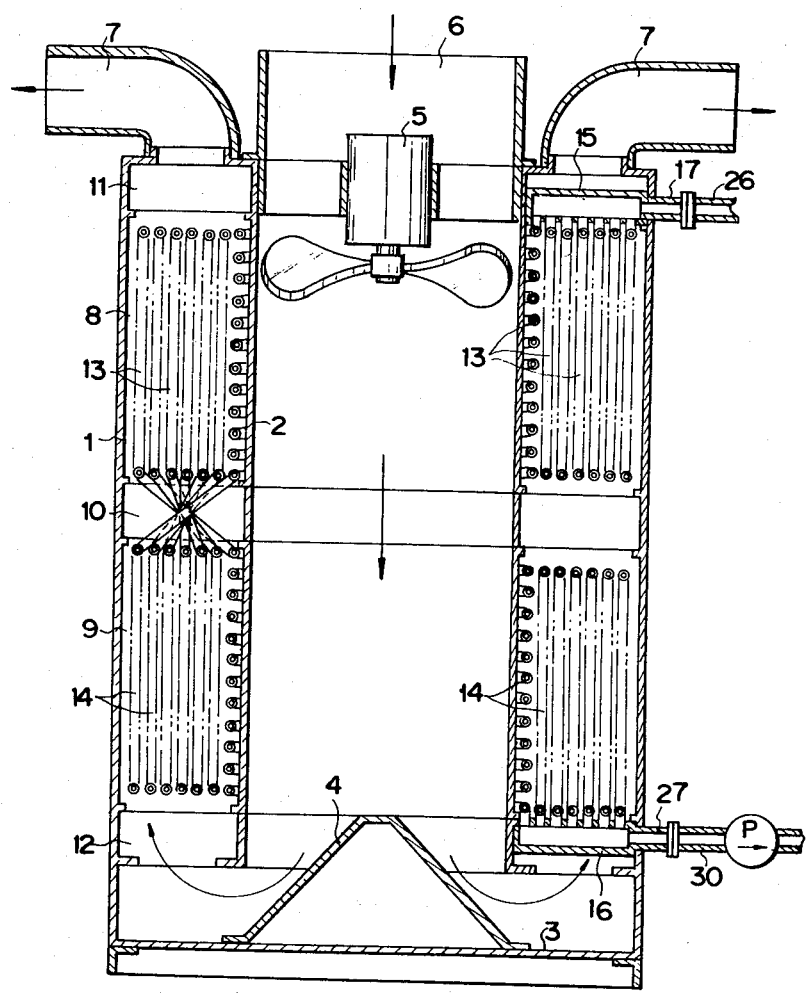
FIG. 4 is a longitudinal cross-section front view of the apparatus of FIG. 1.

A first embodiment of the present invention will now be described referring to FIGS. 1 to 4.

There is provided within a vertically arranged cylindrical main body 1 formed with a lower bottom 3 a similar internal cylinder 2 having a diameter smaller than that of the main body 1 in such a manner that there is provided a desired space between the lower end portion of the internal cylinder 2 and the bottom 3 of the main body 1, a conical wind guide 4 is formed centrally of the lower bottom 3 of the main body 1, blower 5 is provided within an upper end portion of the internal cylinder 2, an air intake 6 is provided above the internal cylinder 2 and a plurality of air exhaust tubes 7 are radially provided at an upper end space between the main body 1 and internal cylinder 2 while there are separately formed upper and lower ring shaped heat exchange compartments 8, 9 within spacings between the main body 1 and internal cylinder 2 in such a manner that there are formed chambers 10, 11, 12 between the heat exchange compartments 8 and 9, on the upper heat exchange compartment 8 and under the lower heat exchange compartment 9 to allow upper and lower chambers 11, 12 to be connected to communicate with each other, with multiple winding coil tubes 13 . . . and 14 . . . being accommodated within upper and lower heat exchange compartments 8, 9 in a concentric manner, ends of upper and lower coil tubes 13 . . . and 14 . . . are connected in the chamber 10 so that coil tubes may be successively connected from the innermost one towards the outermost one, ends of upper coil tubes 13 . . . are connected to a header 15 within the upper chamber 12 and ends of lower coil tubes to a header 16 within the lower chamber 12.

An end of water supply tube 26 is connected to a water inlet 17 provided to the upper header 15 and an end of a water discharge tube 30 to a water outlet 27 provided to the lower header 16. In the drawings, 31 and 32 denote change-over levers, 33 a pressure gauge and 34 a control panel.

The apparatus according to the present invention being constructed as explained above, the main body 1 is installed at an appropriate location such as a place near a ceiling of a greenhouse and the like.

In the apparatus of the present invention explained above, the wind flowing downwardly from an upper internal part of the internal cylinder 2 arranged concentrically within the main body 1 is caused to turn its direction of flow 180° outwardly of the internal tubing by the cone shaped wind guide 4 on the lower bottom 3, moves upwardly from below within heat exchange compartments 9, 8, and exchanges heat with water flowing downwardly from above in multiple winding coil tubes 13 . . . and 14 . . . located within heat exchange compartments 8, 9. The wind and water flow in opposite directions in a counterflow fashion, and the efficiency in the heat exchange may be substantially enhanced. In such a heat exchange arrangement, a considerable number of coil tubes may be placed in the heat exchange compartments 8, 9 by making the diameter of coil tubes 13 . . . and 14 . . . relatively small to increase the surface area contributing to the heat exchange, thus improving the heat exchange performance considerably. Further, multiple winding coil tubes 13 . . . in the upper heat exchange compartment 8 and the same number of coil tubes 14 in the lower heat exchange compartment 9 are so connected in the intermediate chamber 10 that a lower end of each coil tube 13 and an upper end of each coil tube 14 is successively connected, with the innermost coil tube 13 making connection to the outermost coil tube 14, and the outermost coil tube 13 to the innermost coil tube 14 and so forth. By this manner of connection, an overall length of each pair of multiple winding coil tubes 13 . . . and 14 . . . between the upper header 15 and the lower header 16 is the same, offering a reasonable construction as a heat exchange apparatus.

And thus, the heat exchange apparatus (the first embodiment) of the present invention achieves a high degree of performance in the heat exchange, and the apparatus has many merits such as compactness of structure, ease of handling and so forth.

Figure 5:
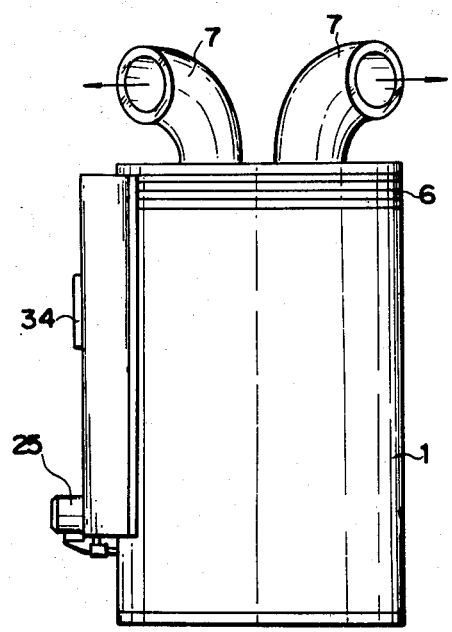
FIG. 5 is a side view of another apparatus according to the invention.
Figure 6:
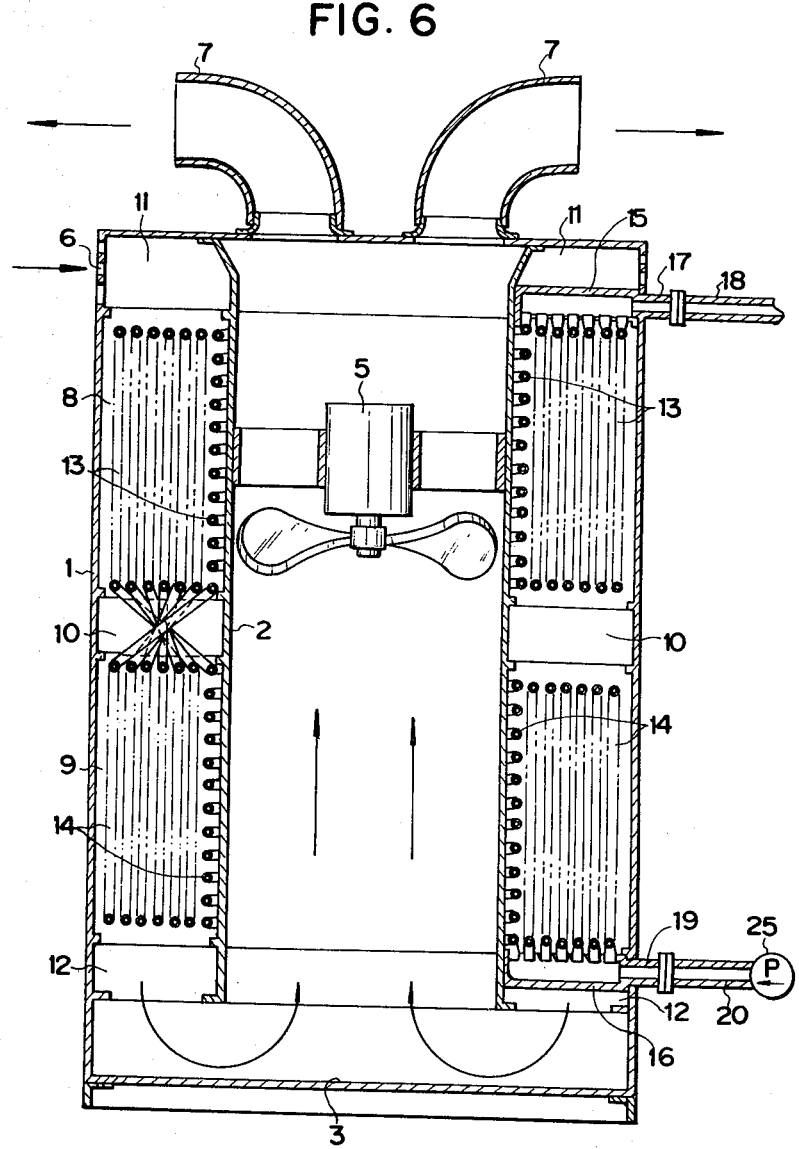
FIG. 6 is a longitudinal cross-sectioned front view of the apparatus of FIG. 5.

In a second embodiment of the invention illustrated in FIGS. 5 and 6, a blower 5 is provided internally of an internal cylinder 2, while a plurality of exhaust tubes 7 are radially provided to an upper end portion of the internal cylinder 2 and an air intake 6 is provided at an upper end portion of a chamber 11 formed between the main body 1 and the internal cylinder 2. And thus, the conical wind guide 4 of the first embodiment is not formed in this second embodiment.

An end of a water discharge tube 18 is connected to a water outlet 17 provided to a header 15, and an end of a water supply tube 20 is connected to a water inlet 19. In FIGS. 5 and 6, the heat exchange apparatus is shown with chambers 10, 12 and a pump 25.

In this second embodiment, air which is taken in through the air intake 6 in the chamber 11 at an upper end portion of a space between the main body 1 and the internal cylinder 2 moves downwardly from above within heat exchange compartments 8, 9, passes through a space between a bottom 3 of the main body 1 and a lower end of the internal cylinder 2, flows upwardly within the internal cylinder 2 from below and is exhausted through exhaust tubes 7. In this flow of air, air that is moving inside the heat exchange compartments 8, 9 exchanges heat with water that is flowing upwardly from below in multiple winding coil tubes 14 ... and 13 ... within heat exchange compartments 8, 9. In this heat exchange, its efficiency is increased due to the so-called counter-flow of air and water. Air taken in through the air intake 6 moves downwardly from the upper portions of heat exchange compartments 8, 9 so that condensed water, if any, is drained quickly, and the efficiency of heat exchange is improved. When air which has passed through heat exchange compartment 9 turns its direction 180° to flow upwardly from below the internal cylinder, air is sucked upwardly by the blower 5. Because of such a structure, resistance to air flow is lessened, and volume of wind may be increased. In turning the direction of air, there is no need to provide any means for guiding air, and thus the cost of making the second embodiment may be lowered.

The blower 5 is provided within the internal cylinder, so that there is formed a chamber between the blower 5 and exhaust tubes 7 provided to the upper end portion of the internal cylinder. This structure serves the purpose of shutting in noises because noises can not easily leak out of the apparatus.

Water flowing in coil tubes 13 ... and 14 ... moves upwardly from below. If an air escape is provided to the upper header 15, air may easily be led out. In this respect, the second embodiment is structured rationally.

In further embodiments of the present invention to be described, an internal cylinder 2 is sealed so that air used for the heat exchange purpose will not pass through it.

Figure 7:
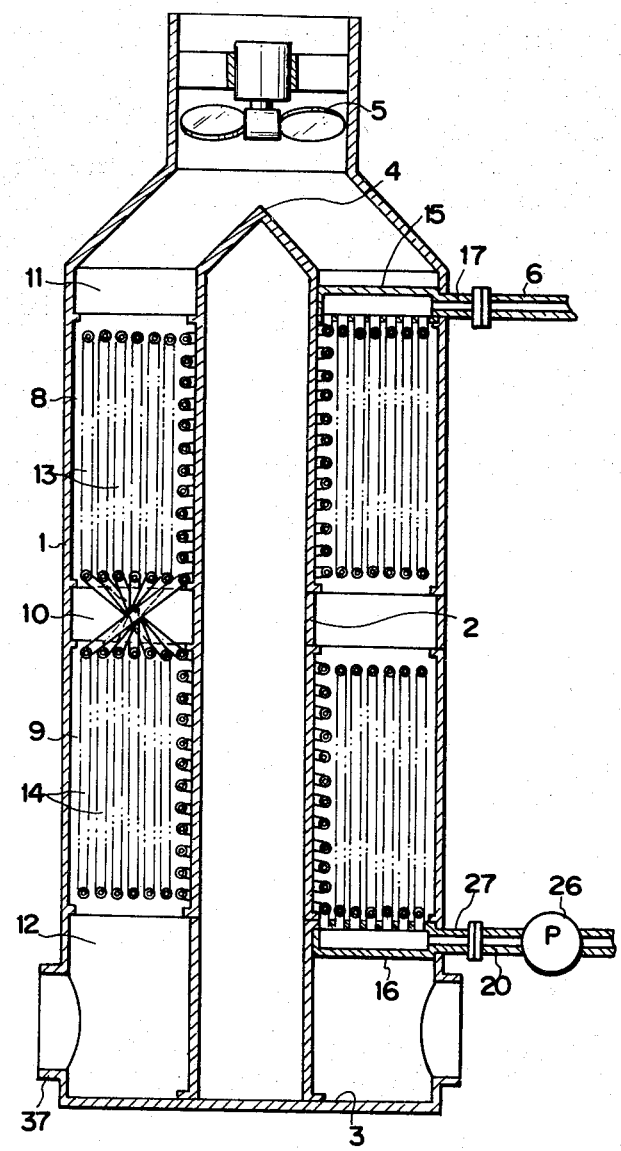
FIG. 7 is a cross-sectional front view of another apparatus according to the invention.

In a third embodiment of the invention illustrated in FIG. 7, a lower end of an internal cylinder 2 is secured to a bottom 3 of a main body 1 while an upper end of the internal cylinder 2 forms a guide 4 of conical shape, a blower 5 is provided above the guide 4 leaving a desired distance therebetween, and a desired number of ventilation tubes 37 are provided to protrude from around lower periphery of the main body. In this structure, the blower 5 sends air either upwardly or downwardly.

This embodiment is further provided with heat exchange compartments 8 and 9, chambers 10, 11 and 12, coil tubes 13, 14 for heat exchange, in upper header 15, a lower header 16, water supply tube 6 and water discharge tube 20, water inlet 17 and water outlet 27, and a pump 26.

Figure 8:
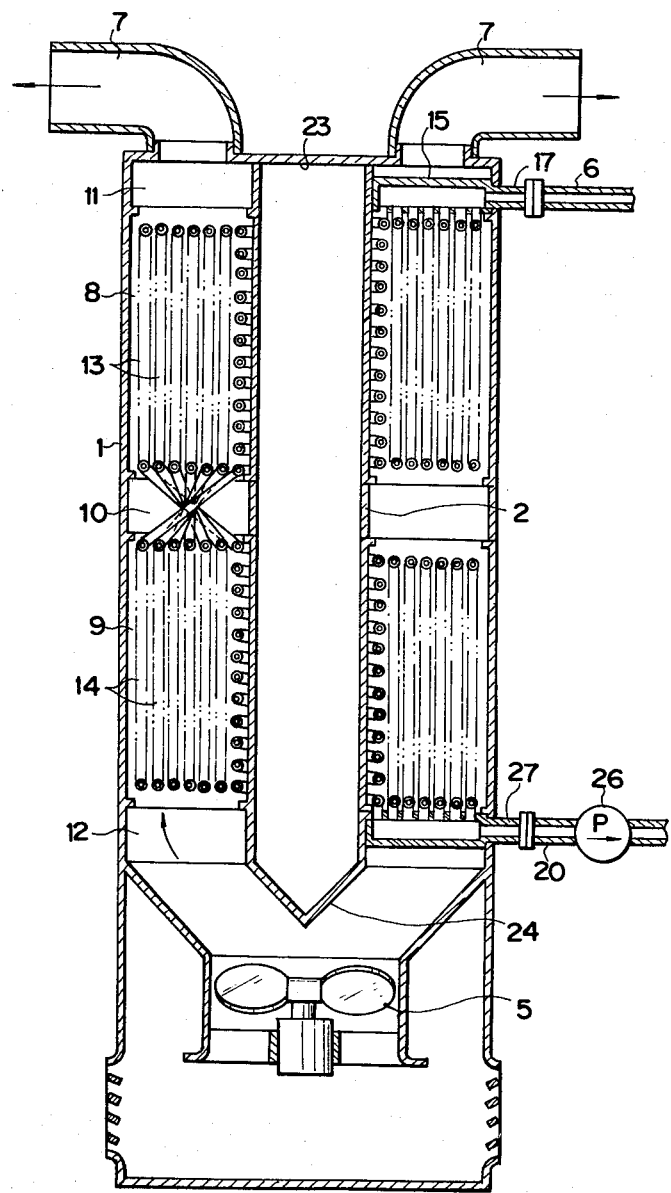
FIG. 8 is a cross-sectional front view of a further apparatus of the invention.

In a fourth embodiment of the invention shown in FIG. 8, an upper end of an internal cylinder 2 is secured to an upper bottom 23 of a main body 1 while a lower end of the internal cylinder 2 forms a guide 24 of conical shape, a blower 5 which sends air upwardly is provided below the guide 24 with a desired distance left between these two members, and a desired number of exhaust tubes 7 are radially and protrudingly provided in an upper portion of a space between the main body 1 and the internal cylinder 2.

This fourth embodiment of the invention also comprises heat exchange compartments 8 and 9, chambers 10, 11 and 12, coil tubes 13, 14 for heat exchange, a water supply tube 6, a water inlet 17, a water discharge tube 20, a water outlet 27, an upper header 15 and a pump 26.

Figure 9:
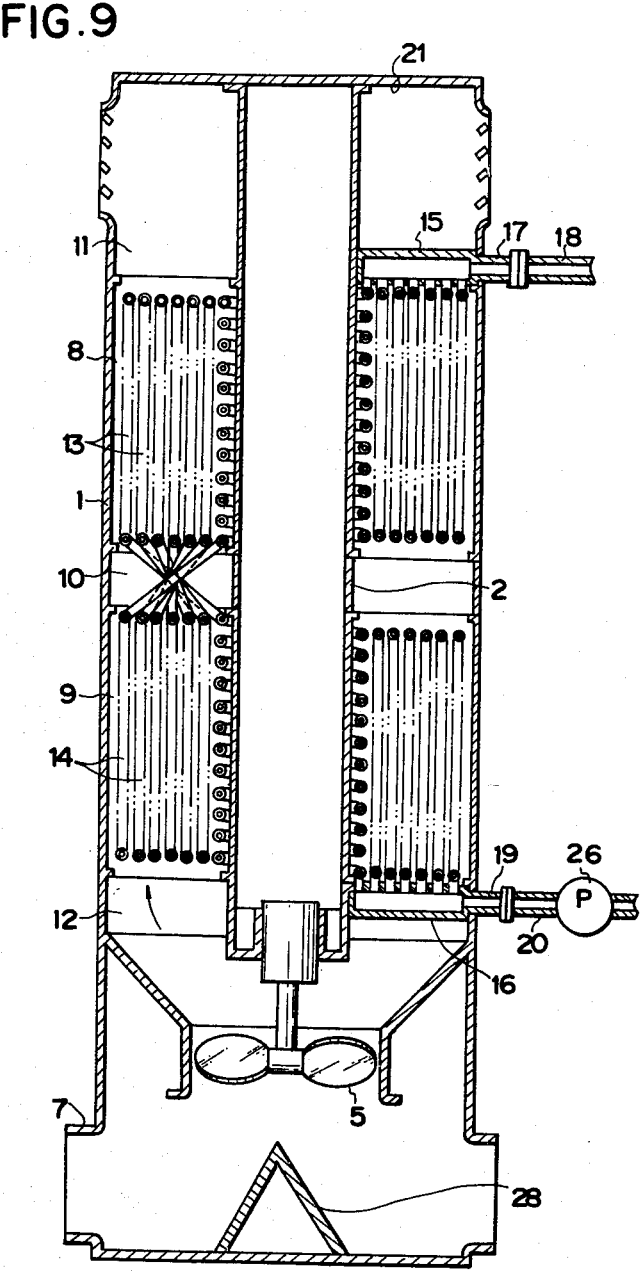
FIG. 9 is a cross-sectioned front view of other apparatus of the invention.

In a fifth embodiment of the invention illustrated in FIG. 9, an upper end of an internal cylinder 2 is secured to an upper bottom 21 of a main body 1 while a blower 5 which sends air downwardly is supported by a lower part of the internal cylinder 2, and a desired number of exhaust tubes 7 are protrudingly provided to lower periphery of the main body 1. Further, a water inlet 17 provided to an upper header 15 and a water outlet 19 provided to a lower header 16 are connected to pipings 18, 20 respectively. The water inlet 17 may be used as a water outlet, and the water outlet 19 as a water inlet.

In the apparatus just described, air moving downwardly or upwardly from above or below external portion of the internal cylinder 2 arranged concentrically within the main body 1 exchanges heat with water flowing upwardly or downwardly from below or above multiple winding coil tubes 13 ... and 14 ... in the heat exchange compartments 8 and 9.

As will be understood from the drawing, this apparatus further comprises chambers 10, 11 and 12, a pump 26 and a guide 28.

Figure 10:
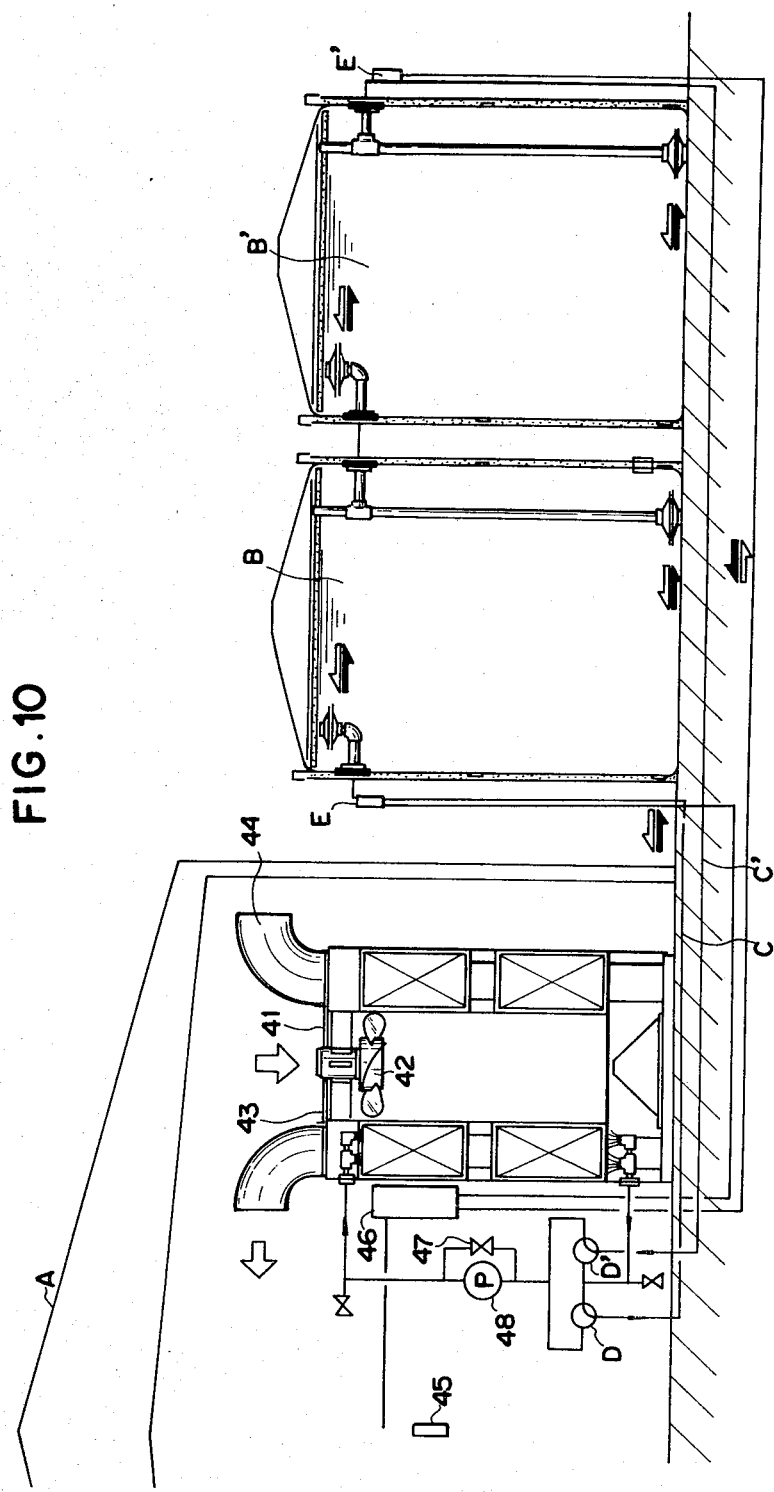
FIG. 10 is a flow chart of a day time heat collecting operation of a warmer apparatus according to the invention.

In other embodiment of the invention which is a warmer apparatus used in horticulture facilities, first to fifth embodiments described so far are incorporated. Such warmer apparatus will now be described. FIG. 10 is a flow chart of the day time heat collecting operation, and FIG. 11 a flow chart of the night time warming operation. In a greenhouse A, there are provided as heat collecting and heat discharge means a heat exchange apparatus 41, a circulating pump 48 and a control unit 46, linked heat storage tanks B, B' as means for stocking heat, with water flow change-over valves D, D' provided to pipings C, C' which connect the heat storage tanks and the heat exchange apparatus 41. The heat exchange apparatus 41 is provided with, at its upper central part, a blower 42, an air inlet 43 at its upper part and internally of its internal periphery, and an air outlet 44 at its upper part and externally of its internal periphery, with its central part formed hollow, and further, internally of its internal periphery, the said heat exchange apparatus 41 is provided with a heat exchange unit of a counterflow type, and a control means (control circuit not shown) comprises a detector means comprising a house temperature sensor 45 attached to an appropriate location in the greenhouse A and sensors E, E' attached to heat storage tanks and a control unit 46 which controls the blower 42, circulating pump and an auxiliary heat source (not shown) upon comparison of the reading of the detector means and a set point. The circulating pump 48 circulates water in pipings connecting the heat exchange unit of the heat exchange apparatus 41 and the linked heat storage tanks which communicate with the heat exchange unit, while there is provided a by-pass valve 47 from near an inlet and an outlet of the circulating pump 48 to vary the flow rate of water in the pipings. Further, by means of change-over valves D, D' it is possible to change over the flow of water in heat storage tanks B, B' to forward and reverse directions.

With the apparatus of the present invention being structured as described above, the sensor 45 which detects the temperature of the greenhouse may be attached to the body of the apparatus or separately to a suitable place in the greenhouse. The sensor of the greenhouse temperature operates to start heat collecting if a set temperature for heat collecting (for example 25° C.) is reached during the day, and when the temperature is below that, both the blower and the pump are stopped.

During the night, the operation starts when the greenhouse temperature is below a set temperature for warming (for example 10° C.), and when the greenhouse temperature is above the set temperature, the blower and the pump stop their operation.

By such an arrangement, there is a technical effect that unnecessary waste of electric power and dissipation of the heat stored in the water are avoided.

While the object of the invention is achieved by the structure described above, more detailed manner of the carrying out of the object of the invention will be described next. During the day, the heat of comparatively high temperature retained by air in the upper space of the greenhouse A is transferred to circulating water by the heat exchange apparatus 41, warm water is then introduced into heat storage tanks B, B' to carry out a phase of heat collecting and storing. In heat storing during the day, the flow of circulating water in the heat storage tank is indicated, as shown in the flow chart of the day time heat collecting operation of FIG. 10, by a dark arrow which denotes the flow direction of water at the time of heat collecting. During the night, water which stocked heat during the day is pumped out of the heat storage tanks B, B', led to the heat exchange apparatus, and exchanges heat with air in the greenhouse, with warmed air being discharged through the air outlet to warm the greenhouse. In collecting the heat during the day, air of comparatively high temperature (25° to 30° C.) in the upper part of the greenhouse and circulating water flow in a counterflow fashion, and circulating water is warmed to a temperature which is close to the temperature of the greenhouse into which it is introduced. Warmed water is introduced into the linked heat storage tanks B, B' as heat storage water, and in the heat storage tank B (the first water tank), water moves from the upper part of the tank to the lower part thereof, with cold water in said tank being transferred to the heat storage tank B' (the second water tank). When the heat storage tank B is filled with warm water, said warm water moves to the tank B'. In this manner of transfer, heat storage tanks are successively filled with water, and the heat is stored in these tanks.

Figure 11:
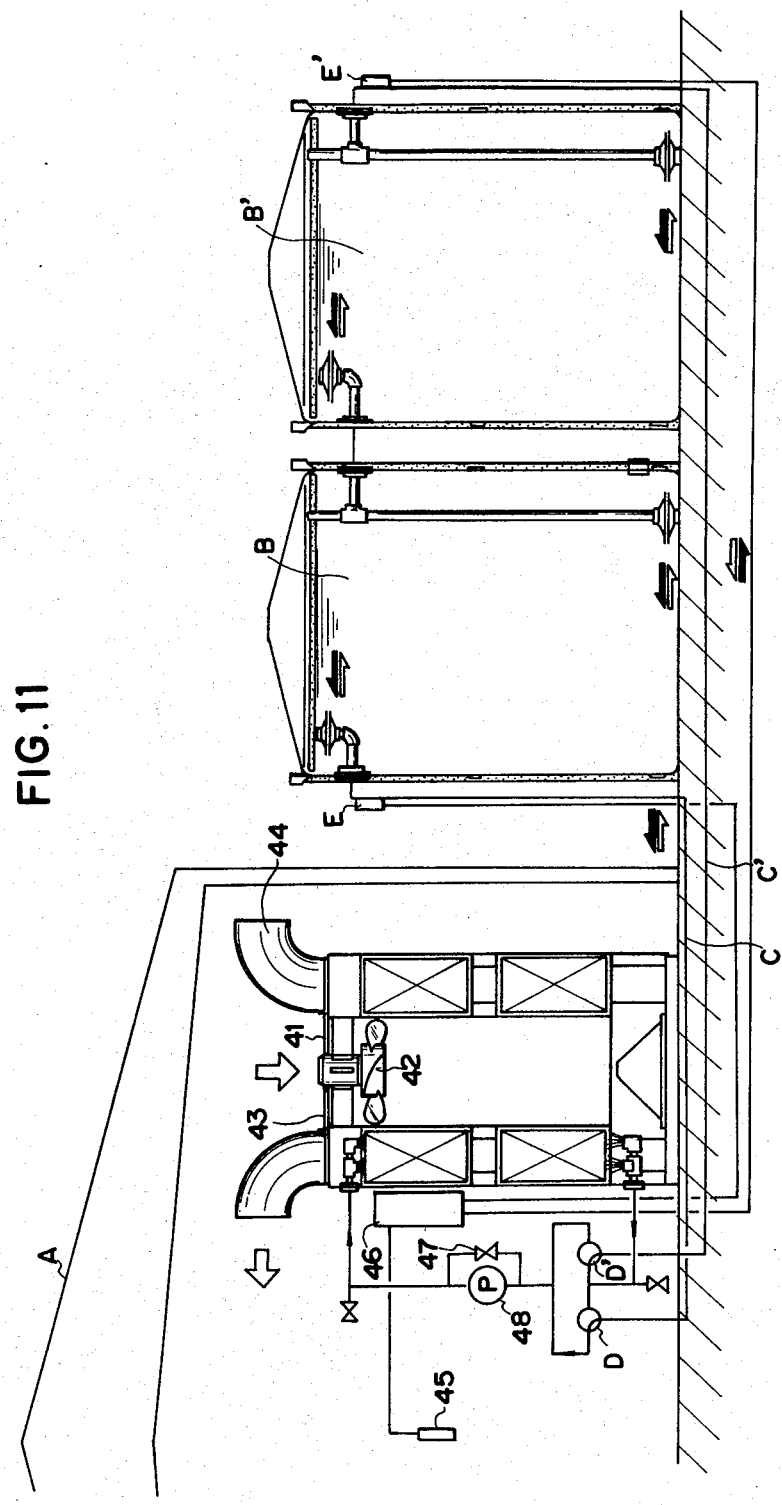
FIG. 11 is a flow chart of a night time warming operation of the warmer apparatus of the invention.

In discharging heat at night, the flow of circulating water in heat storage tanks is indicated, as shown in the flow chart of night time warming operation of FIG. 11, by a hollow arrow which denotes the flow direction of water at the time of warming. Quite contrary to the day time operation, water is pumped out of the tank B. In the heat exchange apparatus, air in the greenhouse and circulating water as heat storage water are caused to flow in a counterflow manner as during the day time, and circulating water which has been warmed to a temperature near the greenhouse temperature during the day is cooled down to comparatively low temperature of the greenhouse (8° to 12° C.), and by this circulation of water, heat retained by warm water is fully utilized. By virtue of the temperature difference between warm water and cool water which is sufficiently large, the volume of the heat storage tank is ⅓ to ¼ compared to the tank of the known system to obtain the same amount of stored heat.

Furthermore, comparatively large amount of air is caused to flow so that relatively high temperature of air and water, or more specifically log-mean temperature difference, may be obtained, thus enabling an economic selection of heat conducting area.

Further explanation of the control of the apparatus will finally be added. When heat collecting conditions deteriorate during the day, the greenhouse temperature sensor detects the greenhouse temperature to prevent low temperature circulating water from flowing into heat storage tanks to regulate operation of the apparatus so as to stop operation of the apparatus at greenhouse temperature which is below the set point while during the night the blower and the pump automatically begin the heat discharge operation when the greenhouse temperature is below a desired temperature. When the greenhouse temperature rises, the apparatus halts and an effective utilization of heat storing water is realized. The sensor of water temperature terminates operation of the apparatus when heat storing water is sufficiently warmed during the day, and when low temperature heat storing water flows during the night and loses its warming capacity, the said sensor also discontinues operation of the apparatus. By this arrangement, unnecessary consumption of power is checked, decrease of the function of the apparatus is thus prevented.

Thus, the invention having been described in its best embodiment and mode of operation, that which is claimed and desired to be protected by Letters Patent is:

1. A warmer apparatus for horticulture facilities utilizing solar heat comprising in combination:

a heat exchange means of a water-air counterflow type for selectively transferring heat from solar heated air in a greenhouse to unheated storage water in a pair of heat storage tanks and transferring heat from heated storage water in said tanks to unheated air in said greenhouse;

a piping means connecting said pair of heat storage tanks to each other and connecting said tanks to said heat exchange means for transporting said storage water to and from said heat exchange means and between said tanks;

a valve means in said piping means for selectively controlling the flow of said storage water from said heat storage tanks to said heat exchange means;

a pump means connected to said piping means for pumping said storage water between said heat exchange means and said heat storage tanks;

a first sensor means in said greenhouse for detecting the temperature of said air within said greenhouse;

a second sensor means associated with said heat storage tanks for detecting the temperature of said storage water in said heat storage tanks; and a control means connected and responsive to said first and second sensor means to start and stop operation of said heat exchange means and said pump means and to operate said valve means to transfer heat from the air in said greenhouse to said storage water in said heat storage tanks until said water is heated to a desired temperature and to transfer heat in said storage water in said storage tanks to the air in said greenhouse until the heat in said storage water falls to a selected temperature.

* * * * *